United States Patent Office 3,635,937
Patented Jan. 18, 1972

3,635,937
ETHYLENE POLYMERIZATION
Ronald S. Bauer, Orinda, Harold Chung, Berkeley, Peter W. Glockner, Alameda, and Wilhelm Keim, Berkeley, Calif., and Henry van Zwet, Amsterdam, Netherlands, assignors to Shell Oil Company, New York, N.Y.
No Drawing. Filed Nov. 5, 1969, Ser. No. 874,374
Int. Cl. C08f 1/58, 3/06
U.S. Cl. 260—94.9 C
9 Claims

ABSTRACT OF THE DISCLOSURE

Highly linear and crystalline polyethylene is produced by contacting ethylene in the presence of a nickel chelate of a bidentate chelating ligand having a tertiary organophosphorus moiety and a carboxymethyl or carboxyethyl group attached directly to the phoshorus atom of the organophosphorus moiety, in liquid phase in a reaction diluent consisting essentially of an alkane, alkene, or mixture thereof.

BACKGROUND OF THE INVENTION

A variety of polymerization catalysts, both homogeneous and heterogeneous, has been utilized to convert ethylene into olefinic products of higher molecular weight, e.g., to dimer and trimer as well as higher oligomers and polymers. However, the character and relative proportions of the product mixture components are greatly dependent upon the particular catalyst and reaction conditions employed.

SUMMARY OF THE INVENTION

It has now been found that polyethylene is produced by polymerizing ethylene in the presence of a nickel chelate of a chelating ligand having a tertiary organophosphorus moiety and a carboxymethyl or carboxyethyl functional group attached directly to the phosphorus atom of the organophosphorus moiety, in a reaction diluent consisting essentially of an alkane, alkene or mixture thereof. The process is characterized by ethylene conversion at moderate temperature to a product mixture consisting essentially of highly linear and crystalline polyethylene.

DESCRIPTION OF THE PREFERRED EMBODIMENTS

The catalyst

The nickel compound employed as catalyst for the polymerization process comprises an atom of nickel chelated with a chelating ligand having a tertiary organophosphorus moiety and a carboxy methyl or carboxyethyl group attached directly to the phosphorus atom of the organophosphorus moiety. Although it is not desired to be bound by any particular theory, it appears likely that the catalyst molecule undergoes chemical transformation during the course of the polymerization reaction possibly involving coordination and/or bonding of ethylene to the nickel moiety. However, it appears likely that the phosphorus-containing chelating ligand remains complexed and/or chemically bonded to the nickel moiety during the course of the polymerization reaction and that this complex of the nickel and the chelating ligand is the effective catalytic species of the polymerization process. In any event, the phosphorus-containing chelating ligand is an essential component of the catalyst and provided the nickel catalyst contains the required phosphorus-containing ligand, the nickel catalyst may be complexed with a variety of additional organic complexing ligands.

Generically, the catalyst as provided to the reaction mixture comprises an atom of nickel complexed or chemically bonded to the phosphorus-containing chelating ligand and sufficient organic complexing ligands to satisfy the coordination number of the nickel atom, which coordination number is preferably four. The phosphorus-containing ligand is a tertiary organophosphorus compound having a carboxymethyl or carboxyethyl group attached directly to the phosphorus atom and generally has from 4 to 100 carbon atoms but preferably from 4 to 60 carbon atoms. A suitable class of tertiary organophosphorus chelating ligands is represented by the Formula I:

wherein X is carboxymethyl or carboxyethyl, R is a monovalent organo group, x and y are zero, one or two and the sum of x and y is two, with the proviso that when x is two the R groups may together with the phosphorus atom form a mono- or bicyclic heterocyclic phosphine having from 5 to 7 carbon atoms in each ring thereof.

The R group is an organo group of from 1 to 20 carbon atoms, preferably of from 1 to 10 carbon atoms, and is preferably free from acetylenic unsaturation. R is therefore suitably saturated aliphatic, i.e., acyclic saturated aliphatic as well as saturated cycloaliphatic; alkenyl, i.e., acyclic alkenyl as well as cycloalkenyl; or is aromatic, preferably mononuclear aromatic, and is a hydrocarbyl group containing only atoms of carbon and hydrogen or is substituted-hydrocarbyl group containing in addition to atoms of carbon and hydrogen other atoms such as oxygen, sulfur, nitrogen and halogen, particularly halogen of atomic number of from 9 to 53 inclusive, i.e., fluorine, bromine, or iodine, which additional atoms are present in functional groups such as alkoxy, aryloxy, carboalkoxy, alkanoyloxy, halo, trihalomethyl, cyano, sulfonylalkyl and like groups having no active hydrogen atoms. The R groups are preferably hydrocarbyl containing only the atoms of hydrogen and carbon. Whenever the R groups contain functional groups, it is preferred that any carbon atoms attached directly to the phosphorus atom be free of functional groups, i.e., any functional groups are not substituted on a carbon atom attached directly to the phosphorus atom.

Illustrative of suitable R groups are hydrocarbon alkyl R groups such as methyl, ethyl, propyl, isobutyl, lauryl, stearyl, cyclohexyl, and cyclopentyl; hydrocarbon alkenyl R groups such as butenyl, hexenyl, cyclohexenyl; alkyl or alkenyl groups having aromatic substituents such as benzyl, phenylcyclohexyl and phenylbutenyl; and substituted-hydrocarbyl R groups such as 4-bromohexyl, 4-carbethoxybutyl, 3-cyanopropyl, 4-chlorocyclohexyl and 4-acetoxybutenyl. Aromatic R groups are exemplified by hydrocarbyl aromatic groups such as phenyl, tolyl, xylyl, p-ethylphenyl, and substituted hydrocarbyl aromatic groups such as p-methoxyphenyl, m-chlorophenyl, m-trifluoromethylphenyl, p-propoxyphenyl, p-cyanophenyl, o-acetoxyphenyl and m-methylsulfonylphenyl.

Illustrative ligands of Formula I wherein x is two (i.e., ligands of the formula $R_2$—P—X) are tertiary organophosphines such as dibutyl(carboxymethyl)phosphine, diphenyl(carboxymethyl)phosphine, di-p-chlorophenyl(carboxymethyl)phosphine, dimethyl(2 - carboxyethyl)phosphine, di-p-cyanophenyl(2-carboxyethyl)phosphine, methyl(phenyl)(2-carboxyethyl)phosphine.

Illustrative ligands of Formula I wherein y is two [i.e., ligands of the formula X—P—$(OR)_2$] are organophosphonous acid esters such as dipropyl carboxymethylphosphonous acid ester, diphenyl carboxymethylphosphonous acid ester, dimethyl 2 - carboxyethylphosphonous acid ester, and di-p-acetoxyphenyl 2-carboxyethylphosphonous acid ester.

Illustrative ligands of Formula I wherein $x$ is one and $y$ is one (i.e., ligands of the formula

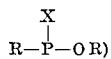

are organophosphinous acid esters such as ethyl phenyl-(carboxymethyl)phosphinous acid ester, phenyl phenyl-(carboxymethyl)phosphinous acid ester, cyclohexyl cyclohexyl(2 - carboxyethyl)phosphinous acid ester, benzyl benzyl(carboxymethyl)phosphinous acid ester and p-acetoxyphenyl butyl(carboxymethyl)phosphinous acid ester.

Illustrative cyclic phosphines of Formula I wherein $x$ is two and the R groups are joined to form heterocyclic rings are mono-cyclic tertiary phosphines such as 5-carboxymethyl-5-phosphacyclopentane, 6 - (2-carboxyethyl)-6-phosphacyclohexane, 7 - (carboxymethyl)-7-phosphacycloheptane; and bicyclic tertiary phosphines such as 8-carboxymethyl - 8 - phosphabicyclo(3.2.1)octane, 8-(2-carboxyethyl) - 8 - phosphabicyclo(3.2.1)octane, 8-carboxymethyl)-8-phosphabicyclo(2.2.2)octane, 9 - carboxymethyl-9-phosphabicyclo(4.2.1)nonane, 9 - carboxymethyl-9-phosphabicyclo(3.3.1)nonane and 9 - (2-carboxyethyl)-9-phosphabicyclo(4.2.1)nonane.

Organophosphine ligands of Formula I ($x$ is two) are preferred over the organophosphonous acid ester ligands of Formula I ($y$ is 2) or the organophosphinous acid ester ligands of Formula I ($y$ is 1, $x$ is 1). Particularly preferred tertiary organophosphines are those wherein both R groups are hydrocarbyl and X is carboxymethyl.

In terms of the phosphorus-containing ligands of Formula I the nickel catalyst may be represented by the Formula II:

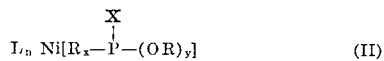

wherein R, X, $x$ and $y$ have the same significance as defined in Formula I, L is an organic complexing ligand and n is one or two. It is to be understood that the nickel catalyst as depicted in Formula II represents only the empirical composition of the nickel catalyst and the precise nature of the bonding between the phosphorus-containing ligand and the nickel moiety is not definitely known. However, it is considered likely that the nickel is in a low valence state, e.g., zero-valent or mono-valent nickel.

The organic complexing ligand L is any ligand other than the required phosphorus-containing ligand which organic ligand is complexed to the nickel atom so as to satisfy the coordination number of the nickel atom. In general, organic complexing ligands such as carbon monoxide, organoarsines organostibines, organobismuthines, and like non-ionic organic ligands which are complexed to the nickel moiety are satisfactory. However, preferred complexing ligands are olefinically unsaturated compounds of from 2 to 20 carbon atoms, of up to 4 olefinic linkages and of up to 3 carbocyclic rings. A particularly preferred class of olefinically unsaturated compounds are olefins of from 2 to 12 carbon atoms and represented by the Formula III:

wherein R' and R" independently is hydrogen, alkyl, cycloalkyl, alkenyl, cycloalkenyl, aralkyl, aryl or alkaryl of up to 8 carbon atoms with the proviso that the R' and R" groups may together form a divalent aliphatic moiety of from 2 to 10 carbon atoms and of up to three additional olefinic double bonds as the sole carbon-carbon unsaturation.

Illustrative olefins of Formula III therefore include ethylene, propylene, 2-butene, 1-pentene, 1-hexene, 1-octene, 1-decene, butadiene, isoprene, 1,3,5-octatriene, 1,3,7-octatriene, cyclopentene, cycloheptene, cyclopentadiene, cyclohexa-1,3-diene, cycloocta-1,5-diene, cyclooctatriene, cyclooctatetraene, and cyclododecatriene.

Illustrative nickel chelates of Formula II are therefore diethylene-diphenyl(carboxymethyl)phosphine-nickel, cyclooctadiene-dibutyl(2-carboxyethyl)phosphine-nickel, cyclooctadiene-diphenyl(2-carboxymethyl)phosphine-nickel,
cyclooctatetraene-[9-carboxymethyl-9-phosphabicyclo-(3.3.1)nonane]nickel,
bis-2-butene-[9-(2-carboxyethyl)-9-phosphabicyclo-(4.2.1)nonane]nickel, and
1,3,7-octatriene[9-carboxymethyl-9-phosphabicyclo-(3.3.1)nonane]nickel.

The nickel chelate employed in the polymerization process is prepared by a variety of methods. In a preferred method, the nickel chelate is prepared by contacting an olefinic-nickel compound and the bidentate phosphine ligand. One class of olefinic nickel compounds useful as catalyst precursors are zero-valent nickel compounds represented by the Formula IV:

 (IV)

wherein R'CH CHR" has the same significance as defined in Formula III. Illustrative nickel compounds of Formula IV are therefore bis(cyclooctadiene)nickel(0), bis-(cyclooctatetraene)nickel(0), and bis(1,3,7 - octatriene)-nickel(0).

Another class of olefinic nickel compounds useful as catalyst precursors is π-allyl nickel compounds wherein the nickel moiety is bonded to a π-allylic moiety characterized by delocalization of the electronic contribution of the π-allyl moiety among three contiguous carbon atoms. One suitable type of π-allyl nickel compounds is represented by the Formula V:

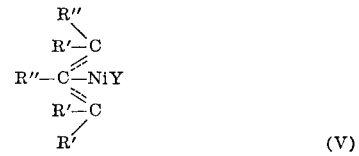 (V)

wherein R' and R" independently are hydrogen, alkyl, cycloalkyl, alkenyl, cycloalkenyl, aralkyl, aryl or alkaryl of up to 8 carbon atoms, Y is halogen, preferably halogen of atomic number from 17 to 35 inclusive, i.e., chlorine or bromine, alkoxy or alkanoyloxy of up to 10 carbon atoms, and the dotted line designation represents the electronic delocalization among the three illustrated contiguous carbon atoms, with the proviso that R" together with one R' may form a divalent alkylene moiety of 2 to 10 carbon atoms, preferably 2 to 5, and of up to 3 additional olefinic double bonds. When considered as a whole, preferred π-allyl moieties have from 3 to 12 carbon atoms and are otherwise free from aliphatic unsaturation unless the π-allyl moiety is part of a closed ring system.

Illustrative of suitable π-allyl nickel halides of the above Formula V are π-allylnickel chloride, π-allylnickel bromide, π-crotylnickel chloride, π-methylallylnickel chloride, π-ethylallylnickel chloride, π-cyclopentylnickel bromide, π-cyclooctenylnickel chloride, π-cyclooctadienylnickel chloride, π-cinnamylnickel bromide, π-phenylallylnickel chloride, π-cyclohexenylnickel bromide, π-cyclododecenylnickel chloride π - cyclododecatrienylnickel chloride. Although the complex of the above Formula V and other π-allyl nickel halides probably exist independently in the form of a dimer, for convenience and simplicity the π-allyl nickel halides are herein depicted and named as monomeric species.

Other suitable π-allyl nickel compounds of Formula V are π-allylnickel acetate, π-methylallylnickel propionate, π-cyclooctenylnickel octoate, π-allylnickel methoxyate and π-allylnickel ethoxyate.

Another suitable type of π-allyl nickel compound useful as catalyst precursors is bis-allyl nickel compound represented by the Formula VI

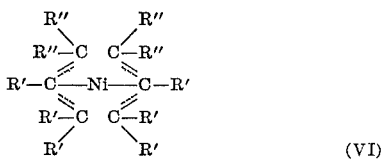

(VI)

wherein R″, R′ and the dotted line designation have the same significance as defined in Formula V, with the proviso that R″ together with one R′ of the same π-allylic moiety may form a divalent alkylene moiety of 2 to 10 carbon atoms, preferably of 2 to 5. When considered as a whole, preferred π-allyl moieties have from 3 to 12 carbon atoms and are otherwise free from aliphatic unsaturation unless the allyl moiety is part of a closed ring system. Illustrative of suitable bis-π-allyl nickel compounds of the above Formula VI are bis-π-allyl nickel, bis-π-methallyl nickel, bis-π-cinnamylnickel, bis-π-octadienylnickel, bis-π-cyclohexenylnickel, π-allyl-π-methallylnickel, and bis-π-cyclooctatrienylnickel.

The olefinic-nickel catalyst component and the phosphorus-containing ligand catalyst component are generally contacted in substantially equimolar amounts, e.g., the molar ratio of olefinic-nickel compound to the ligand varies from about 1.2:1 to 1:1.2, but is preferably about 1:1. The catalyst composition is suitably preformed by contacting the catalyst precursors in an inert diluent, e.g., diluents employed for the polymerization process or aromatic hydrocarbons such as benzene or toluene. In another modification, however, the catalyst precursor components are contacted in the presence of the ethylene reactant and the reaction diluent during the initiation of the polymerization process. By any modification, the catalyst precursor components are contacted at temperatures from about 20° C. to 100° C.

The amount of nickel catalyst employed in the polymerization process is not critical. In general, amounts of the nicked catalyst of from 0.001% to about 100% by weight based on ethylene are satisfactory with amounts of from about 0.01% to about 25% by weight on the same basis being preferred.

The reaction diluent

In order to obtain polyethylene as the predominent or sole product in the polymerization process, it is essential to employ as diluent an alkane, alkene, or mixture thereof which is liquid at reaction temperature and pressure. Suitable alkanes and alkenes are those of from 4 to 20 carbon atoms, preferably of from 4 to 12 carbon atoms. Illustrative alkanes, including cycloalkanes, are butane, pentane, isopentane, cyclopentane, methylcyclohexane, decane, dodieane, tetradecane, eicosane. Illustrative alkenes, including cycloalkenes, are 1-butene, 2-pentene, 3-hexene, cyclohexene, 1-heptene, hexadecene, eicosene.

In modification of the process wherein the catalyst is prepared in an aromatic hydrocarbon solvent, e.g., benzene, the reaction diluent may also contain a small amount of the aromatic hydrocarbon employed in catalyst preparation. However, it is preferred that the reaction diluent consist of at least 80% by weight, more preferably at least 90% by weight, of an alkane, alkene or mixture thereof.

The amount of reaction diluent is not critical. Weight ratios of reaction diluent to nickel catalyst of from about 1:1 to 1000:1 are satisfactory with weight ratios of reaction diluent to nickel catalyst of from about 1:1 to 100:1 being preferred.

Reaction conditions

The precise method of establish ethylene/catalyst contact is not critical. In one modification, the nickel catalyst and the diluent are charged to an autoclave or similar pressure reactor, the ethylene feed is introduced, and the reaction mixture is maintained with agitation at reaction temperature and pressure for the desired reaction period. Another modification comprises passing, in a continuous manner, the ethylene reactant and nickel catalyst in liquid phase solution in the reaction diluent through a reaction zone maintained at reaction temperature and pressure. In yet another modification, the ethylene is added to a mixture of the nickel catalyst and diluent in increments or continuously. By any modification, the polymerization process is conducted at moderate temperatures and pressures. Suitable reaction temperatures vary from about 10° C. to 250° C., but preferably from 20° C. to 100° C. The reaction is conducted at or above atmospheric pressure. The precise pressure is not critical, so long as the reaction mixture is maintained substantially in a non-gaseous phase. Typical pressures vary from about 10 p.s.i.g. to 5000 p.s.i.g. with the range from about 100 p.s.i.g. to 1000 p.s.i.g. being preferred.

The process is suitably conducted in an inert reaction environment so that the presence of reactive materials such as oxygen is desirably avoided. Reaction conditions are therefore substantially oxygen-free.

The polyethylene products are materials of established utility. The products are highly linear and crystalline having melting points of from 130° C. to 140° C. and higher, densities of about 0.96 g./cc. and higher, and crystallinity of 74.6% and higher. Typical weight average molecular weights are from about 6,000 to 200,000, but more typically from about 80,000 to 176,000 and intrinsic viscosities (150° C. in decane) are from about 5 to 15 dl./g.

EXAMPLE I

A series of ethylene polymerization reactions with a nickel catalyst prepared from bis-1,5-cyclooctadienenickel-(0) and diphenylcarboxymethylphosphine was conducted in a variety of alkane and alkene diluents. Each run was conducted with a sample of nickel catalyst prepared by contacting 0.26 g. to 0.74 g. of bis-1,5-cyclooctadienenickel(0) and an equimolar amount of diphenylcarboxymethylphosphine in about 3 ml. of benzene.

The resulting catalyst solution, 10–12 g. of ethylene and 20–30 ml. of the indicated diluent was charged to an 80-ml. autoclave. The reaction conditions and results are provided in Table I. Infrared analysis of the polyethylene product showed a crystallinity value of about 75%. The weight average molecular weight of the polyethylene products was about 95,000.

TABLE I

| | Run number | | | |
|---|---|---|---|---|
| | 1 | 2 | 3 | 4 |
| Solvent | Heptane [1] | Butene-1 [2] | Decane-1 [3] | Hexadecene-1 [4] |
| Reaction conditions: | | | | |
| Time, hours | 2½ | 15 | 3¼ | 14 |
| Temperature | 70 | 78 | 70 | 55 |
| Ethylene pressure, p.s.i.g. | 810 | 600 | 725 | 725 |
| Ethylene conversion, percent | 17 | 44 | 11 | 68 |
| Gram oligomer product/ gram Ni/hour | 15 | 2 | 8 | 7 |
| Product distribution: | | | | |
| C₄-C₂₀ oligomers, percent wt | ~5 | ~5 | ~5 | ~5 |
| Polyethylene, percent wt | 95 | 95 | 95 | 95 |

[1] 20 ml.  [2] 29.4 ml.  [3] 10 g.  [4] 25 ml.

EXAMPLE II

A sample of (1,5-cyclooctadiene)-[9-carboxymethyl-9-phosphabicyclo(4.2.1)nonane]-nickel(0) was prepared by contacting approximately equimolar amounts of bis-1,5-cyclooctadienenickel(0) and 9-carboxymethyl-9-phosphabicyclo(4.2.1)nonane in a solution mixture of tetrahydrofuran and toluene. The resulting nickel complex was filtered and dried under reduced pressure.

A 0.3 g. sample of the nickel complex was then contacted with about 10 g. of ethylene and 30 ml. of hexane in an autoclave at a pressure of 900–1000 p.s.i.g. and a temperature of 65° C. for four hours. After cooling the autoclave to about 25° C., a 4.4 g. sample of polyethylene having a density of about 0.963 g./cc. and a weight average molecular weight of about 162,000 was isolated.

EXAMPLE III

A solution of 47.3 g. of chloroacetic acid in 350 ml. of benzene was mixed with a solution of 71 g. of 9-H-9-phosphabicyclo(3.3.1)nonane in 160 ml. of t-butyltoluene under an atmosphere of nitrogen. The inert nitrogen atmosphere was maintained and the resulting reaction mixture was stirred and slowly heated to reflux. After one hour under reflux (temperature 90° C.) the mixture was allowed to cool overnight during which time solid 9-H-9-carboxymethylbicyclo(3.3.1)nonyl-9-phosphonium chloride precipitated. The solid phosphonium chloride salt was removed by filtration washed with benzene and dried in a vacuum oven. The crude phosphonium chloride product weighed 110 g. A sample of the phosphonium chloride product was recrystallized from boiling ethanol to afford pure 9-H-9-carboxymethyl-bicyclo(3.3.1)nonyl-9-phosphonium chloride, M.P. 303–305° C. (sealed tube). Elemental analysis of the pure phosphonium chloride salt gave the following results:

Calcd. for $C_{10}H_{18}ClO_2P$ (percent): C, 50.7; H, 7.7; Cl, 15.0; P, 13.1. Found (percent): C, 50.4; H, 7.8; Cl, 14.9; P, 13.2.

A 59.2 g. sample of the crude phosphonium chloride product was dissolved in 250 ml. of 50% deaerated aqueous methanol under a nitrogen atmosphere. A solution of 42.8 ml. of 6 N sodium hydroxide was added slowly to the methanol solution. The resulting solution was then evaporated at 60° C. under reduced pressure and the residue was subsequently dried at 60° C. over phosphorus pentoxide. The residue was extracted with ether in a vapor jacketed Soxhlet extractor under an atmosphere of nitrogen. The ether extract deposited 18.1 g. of 9-carboxymethyl-9-phosphabicyclo(3.3.1)nonane, M.P. 131–132° C. Elemental analysis of the 9-carboxymethyl-9-phosphabicyclo(3.3.1)nonane gave the following results:

Calcd. for $C_{10}H_{17}O_2P$ (percent): C, 60.0; H, 8.6; P, 15.6. Found (percent): C, 60.0; H, 8.5; P, 15.6.

Concentration of the ether extract afforded an additional 24.5 g .of 9-carboxymethyl-9-phosphabicyclo(3.3.1)nonane.

EXAMPLE IV

By a procedure similar to that of Example III, a sample of 9-(2-carboxyethyl) - 9 - phosphabicyclo(3.3.1)nonane was prepared by (1) reaction of 3-bromopropionic acid and 9-H-9-phosphabicyclo(3.3.1)nonane to produce 9-H-9-(2-carboxyethyl)bicyclo(3.3.1)nonyl - 9 - phosphonium bromide and (2) subsequently neutralizing the phosphonium bromide salt with 1 equivalent of sodium hydroxide to produce the 9-(2-carboxyethyl)-9-phosphabicyclo(3.3.1) nonane product.

We claim as our invention:

1. A process of producing polyethylene by contacting ethylene at a temperature of about 10° C. to 250° C. in the presence of a nickel complex represented by the formula

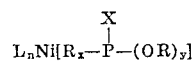

wherein L is an olefinically unsaturated ligand of 2 to 20 carbon atoms, X is carboxymethyl or carboxyethyl, R is a hydrocarbyl group of 1 to 20 carbon atoms, $x$ is 0, 1 or 2, $y$ is 0, 1 or 2, the sum of $x+y$ is two, $n$ is 1 or 2, with the proviso that when $x$ is 2, the R groups may together with the phosphorus atom form a mono or bicyclic heterocyclic phosphine having from 5 to 7 carbon atoms in each ring thereof in liquid phase in a reaction diluent consisting essentially of an alkane, alkene, or mixture thereof.

2. The process of claim 1 wherein the nickel chelate is prepared by contacting in an inert diluent the chelating ligand of the formula

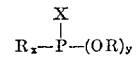

and an olefinic-nickel compound of the formula

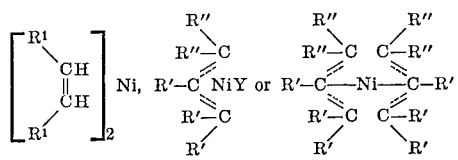

wherein R' and R" independently are hydrogen, alkyl, cycloalkyl, alkenyl, cycloalkenyl, aralkyl, aryl or alkaryl of up to 8 carbon atoms and Y is halogen of atomic number 17 to 53 inclusive, alkoxy or alkanoyloxy of up to 10 carbon atoms with the provisio that one R" together with one R' may for a divalent alkylene moiety of from 2 to 10 carbon atoms of up to three additional olefinic double bonds.

3. The process of claim 2 wherein $x$ is 2.

4. The process of claim 3 wherein the R groups of the chelating ligand are hydrocarbyl.

5. The process of claim 1 wherein X is carboxymethyl.

6. The process of claim 5 wherein the reaction diluent is an alkane of from 4 to 20 carbon atoms.

7. The process of claim 6 wherein the chelating ligand is 9-carboxymethyl-9-phosphabicyclononane.

8. The process of claim 6 wherein the chelating ligand is diphenylcarboxymethylphosphine.

9. The process of claim 8 wherein the olefinic-nickel compound is bis-1,5-cyclooctadienenickel(0).

References Cited

UNITED STATES PATENTS 3,454,538   7/1969   Naarmann et al. _____ 260—94.9
3,400,163   9/1968   Mason et al. _____ 252—431 PX JOSEPH L. SCHOFER, Primary Examiner E. J. SMITH, Assistant Examiner U.S. Cl. X.R.

252—431 C, 431 N, 431 P; 260—94.9 B, 683, 15 D